Nov. 17, 1931.  W. R. PETERSON  1,832,049
TRACTOR DISK HARROW
Filed Nov. 22, 1930   2 Sheets-Sheet 1
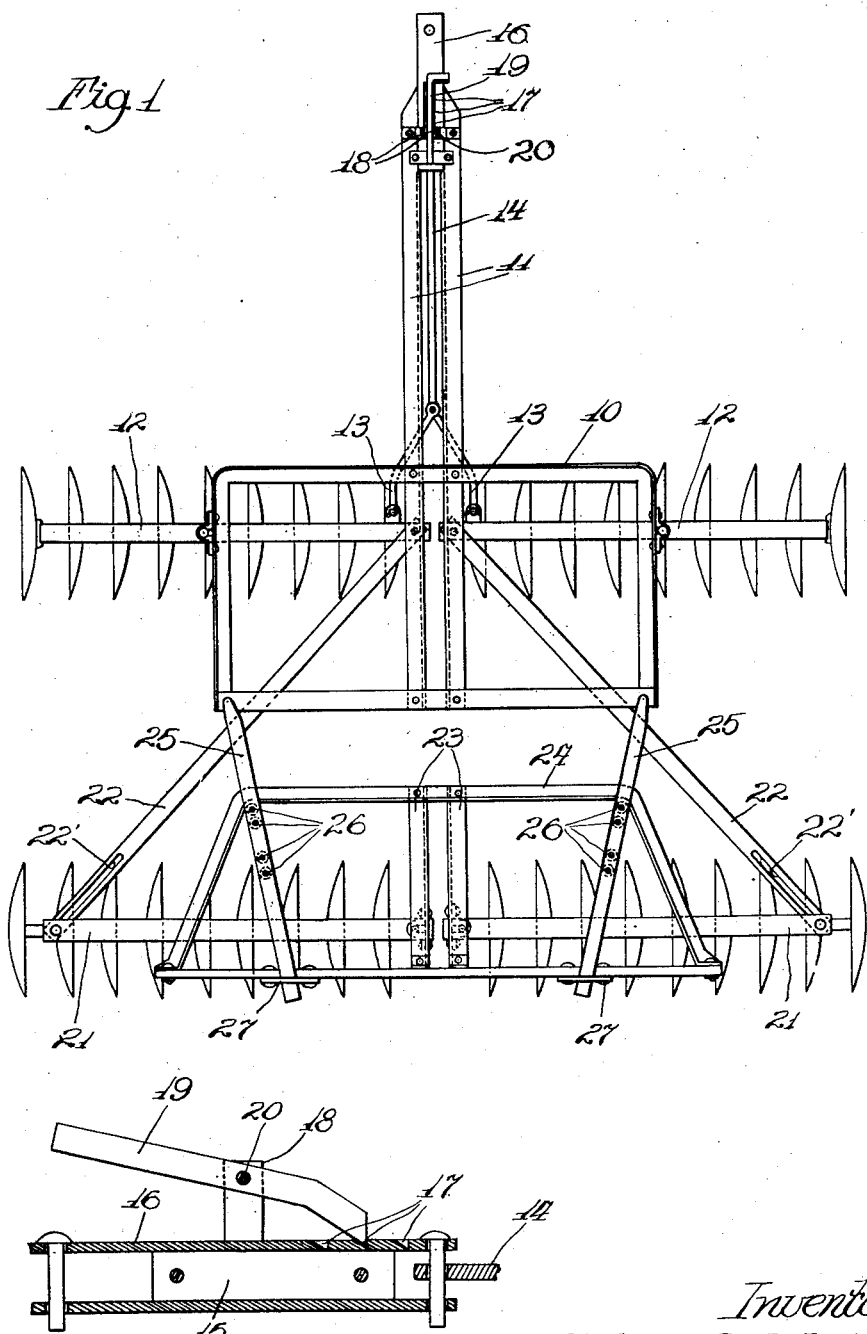

Nov. 17, 1931.    W. R. PETERSON    1,832,049
TRACTOR DISK HARROW
Filed Nov. 22, 1930    2 Sheets-Sheet 2

Inventor
Walter R. Peterson
By [signature] Atty.

Patented Nov. 17, 1931

1,832,049

UNITED STATES PATENT OFFICE

WALTER R. PETERSON, OF PARK RIDGE, ILLINOIS, ASSIGNOR TO INTERNATIONAL HARVESTER COMPANY, A CORPORATION OF NEW JERSEY

TRACTOR DISK HARROW

Application filed November 22, 1930. Serial No. 497,410.

This invention relates to disk harrows. More particularly it relates to an improved angling means for a tandem disk harrow.

The principal object of the invention is to provide improved angling means for adjusting the relative positions of the disk gangs. Another object is to provide a construction which will allow the inside rear gang to trail properly on a turn.

Other more specific objects and the means by which they are accomplished will be apparent from the detailed description to follow.

In the drawings:

Figure 1 is a plan view, showing a tandem disk harrow embodying the invention with the disk gangs arranged in parallel relationship;

Figure 2 is an enlarged detail, showing the detent mechanism employed for holding the gangs in various angled positions;

Figure 3:
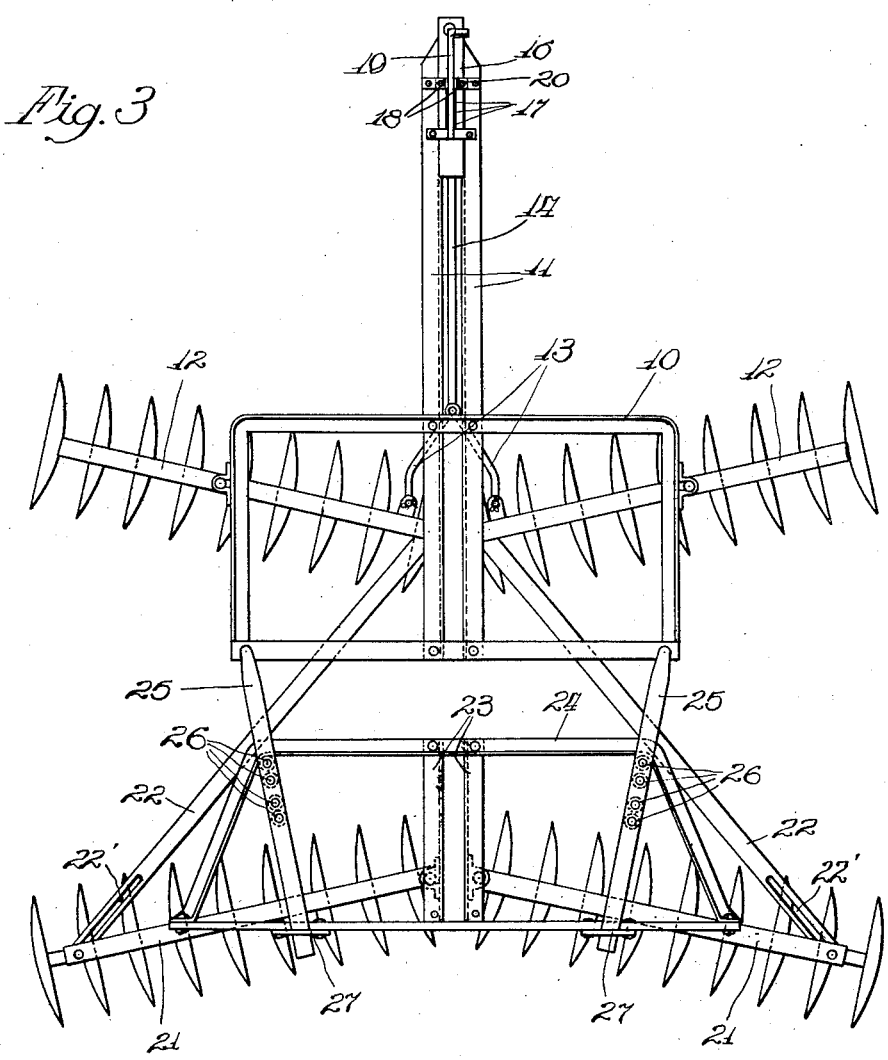
Figure 3 is a plan view, showing the disk harrow of Figure 1 with the gangs in angled position; and, Figure 4 is a side elevation of the harrow shown in Figure 1.

The drawings show only such details of construction as are necessary to clearly illustrate the invention. The particular disk gangs utilized and the means employed for mounting them may be of any conventional construction. A forward frame 10, substantially rectangular in shape, is rigidly secured to two spaced, forwardly extending draft members 11. Disk gangs having frame structures 12 are pivoted near their centers at the ends of the frame 10. At the inner ends of the disk gangs, which are positioned closely adjacent each other, links 13 are pivotally attached to the frame structures of the disk gangs and to a draft element 14, which extends forwardly between the draft members 11.

At the forward ends of the draft members 11, a block 15 is rigidly secured in position between said members. As best shown in Figure 2, the draft element 14 is pivotally connected to bars 16 which are slidably mounted above and below the block 15. The bars 16 form a draft connection for attaching the harrow to the drawbar of a tractor. The upper bar 16 is provided with a plurality of notches 17 having substantially vertical edges on the rear sides for a purpose to be hereinafter described. Upstanding brackets 18 attached to the members 11 provide a means for attaching a latch member 19, which is pivotally mounted on a pin 20 extending through the brackets 18.

Figure 4:
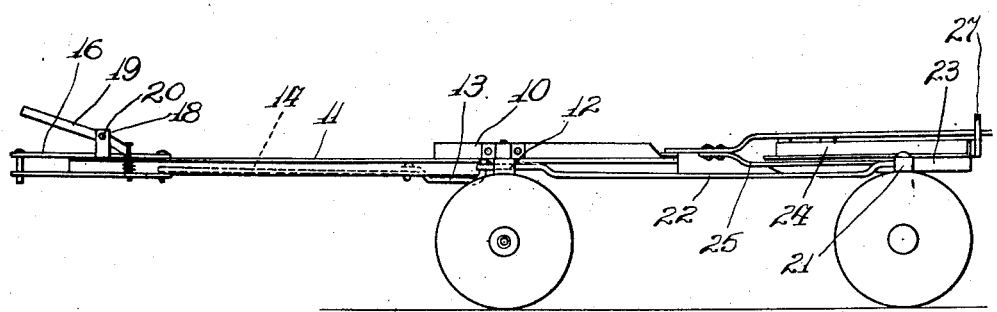

The extended forward end of the member 19 provides means for disengaging the latch member. The rearward end of said member extends downwardly and is shaped to engage the notches 17. A second pair of disk gangs is positioned in tandem relation behind the forwardly positioned gangs. Said gangs are provided with frame structures 21. Draft links 22 are pivotally attached to the outer ends of the frame structure 21 and to the inner ends of the frame structures 12 of the forwardly positioned gangs. Slots 22' formed in the bars 22 provide for limited sliding movement of the bars with respect to the frames 21, said movement being permitted by sliding of the pivot pins in the slots 22'. The inner adjacent ends of the rear gangs are pivotally attached to members 23, which are rigidly secured at the center of a rearwardly positioned frame at 24. The ends of the frame 24 are tapered rearwardly outwardly. Draft bars 25, pivotally attached at the rear corners of the front frame extend rearwardly inwardly over the corners of the rear frame and across said frame. Said draft bars 25 are provided with upper and lower portions, as shown in Figure 4, which pass respectively over and under the rear frame. A plurality of aligned holes 26 in said portions are provided for the insertion of pins which are adapted to engage the inner sides of the forward portion of the rear frame structure. The relative position of the parts is such that said pins engage the inner corners of the rear frame. At the rear side of the rear frame, guides 27 are secured to the frame through which the draft bars 25 may slide.

In the operation of the disk harrow of this invention, draft is applied to the bars 16. Assuming that the disk gangs are in parallel relationship, as shown in Figure 1, the latch member 19 will be engaged in one of the notches 17 and the harrow may be operated with said gangs maintained in parallel positions. When a turn is made, for example to the right, the forward disk gangs turn as if they were rigidly mounted on the forward frame. The construction of the draft bar 25 permits the bar on the right to slide or telescope rearwardly through the guide 27. The slot 22' in the link 22 also permits the link at the same side to slide rearwardly, allowing the rear gangs to follow around in trailing relationship. By this construction the links 22 are tension elements only within the range of movement permitted by the slots 22'.

When it is desired to angle the disk gangs, as shown in Figure 3, pressure is applied to the members 16 by reversing the operation of the tractor or other draft means. By this means, the inner ends of the forward disk gangs are pushed rearwardly, thereby angling said gangs. At the same time, pressure is applied to the draft links 22 at the outer ends of the rear gangs. The links slide rearwardly with respect to the frame 21. When draft is applied the rear gangs drop back whereby they are angled in a direction opposite to the forward gangs. As shown in Figure 2, the forward edges of the notches 17 being slanted, it is not necessry to operate the latch member when the gangs are angled. After the gangs have been angled to the desired degree, draft is again applied to the members 16. The latch member 19 automatically seats in one of the notches 17 and the disk gangs are maintained in angled position. Whenever it is found desirable to straighten out the gangs to parallel positions, it is only necessary to press down the latch member 19, disengaging it from the bar 16. Draft is then applied with the result that the element 14 is pulled forwardly with respect to the draft members 11. The inner ends of the forward gangs are pulled forwardly, and, through the draft links 22, the outer ends of the rear gangs are pulled forwardly. By such means, the gangs are returned to a parallel position.

It is to be understood that applicant has shown and described only a preferred embodiment of his improved disk harrow and that he claims as his invention any modification thereof falling within the scope of the appended claims.

What is claimed as new is:

1. A disk harrow comprising a front frame, a pair of disk gangs pivotally attached at their centers to the outer ends of the frame, a rear frame, a pair of disk gangs pivotally attached at adjacent ends to the frame near its center, draft elements pivotally attached to each end of the forward frame and extending rearwardly across the rear frame, stops on said elements positioned to engage the rear frame on forward movement of the front frame, and tension elements connecting the outer ends of the rear gangs to the inner ends of the front gangs.

2. A disk harrow comprising a front frame, a pair of disk gangs pivotally attached at their centers to the outer ends of the frame, a rear frame, a pair of disk gangs pivotally attached at adjacent ends to the frame near its center, draft elements pivotally attached to each end of the forward frame and extending rearwardly across the rear frame, stops on said elements positioned to engage the rear frame on forward movement of the front frame, and draft links connecting the outer ends of the rear gangs to the inner ends of the front gangs, said links being connected to transmit tension to said frame and to slide with respect thereto upon the application of pressure.

3. A disk harrow comprising a front frame, a pair of disk gangs pivotally attached at their centers to the outer ends of the frame, a rear frame, a pair of disk gangs pivotally attached at adjacent ends to the frame near its center, draft elements pivotally attached to each end of the forward frame and extending rearwardly across the rear frame, stops on said elements positioned to engage the rear frame on forward movement of the front frame, and draft links connecting the outer ends of the rear gangs to the inner ends of the front gangs.

4. A disk harrow comprising a front frame, a pair of disk gangs pivotally attached at their centers to the outer ends of the frame, draft actuated means for angling said disk gangs, a rear frame, a pair of disk gangs pivotally attached at adjacent ends to the frame near its center, draft elements pivotally attached to each end of the forward frame and extending rearwardly across the rear frame, stops on said elements positioned to engage the rear frame on forward movement of the front frame and adapted to permit relative angular movement of the two frames upon turning, and draft links connecting the outer ends of the rear gangs with the inner ends of the corresponding front gangs.

5. A disk harrow comprising a front frame, forwardly extending draft means attached to said frame, a pair of disk gangs pivotally attached at their centers to the outer ends of the frame, forwardly extending angling elements attached to the inner ends of the gangs and to a draft element slidably mounted with respect to the draft means, means for locking said draft element with respect to the draft means, a rear frame, a pair of disk gangs pivotally attached at adjacent ends to the frame near its center, draft elements pivotally attached to each end of the forward frame and extending rearwardly across the rear frame, stops on said elements positioned to engage the rear frame on forward movement of the front frame and draft links connecting the outer ends of the rear gangs with the inner ends of the corresponding front gangs.

6. A disk harrow comprising a front frame, forwardly extending draft members attached to said frame, a pair of disk gangs pivotally attached at their centers to the outer ends of the frame, forwardly extending angling elements attached to the inner ends of the gangs and to a draft element slidably mounted with respect to the draft members, manually releasable means for locking said draft element with respect to the draft members, a rear frame, a pair of disk gangs pivotally attached at adjacent ends to the frame near its center, draft elements pivotally attached to each end of the forward frame and extending rearwardly across the rear frame, stops on said elements positioned to engage the rear frame on forward movement of the front frame, and draft links connecting the outer ends of the rear gangs with the inner ends of the corresponding front gangs.

7. A tandem disk harrow comprising a front frame, spaced forwardly extending draft members rigidly attached to said frame, a pair of disk gangs pivotally attached at their centers to the outer ends of the frame, the inner ends of the gangs being adjacent each other at the center of the frame, a forwardly extending angling element attached to the inner ends of the gangs and to a draft element slidably mounted between the forwardly extending draft members, manually releasable means for locking said draft element with respect to the draft members, a rear frame, a pair of disk gangs pivotally attached at adjacent ends to the frame near its center, draft bars pivotally attached to each end of the forward frame and extending rearwardly across the rear frame, adjustable stops on said bars positioned to engage the rear frame on forward movement of the front frame and adapted to permit relative movement of the two frames upon turning or reverse movement of the front frame, guides for the draft bar on the rear frame, and draft links connecting the outer ends of the rear gangs with the inner ends of the corresponding front gangs.

In testimony whereof I affix my signature.
WALTER R. PETERSON.